UNITED STATES PATENT OFFICE.

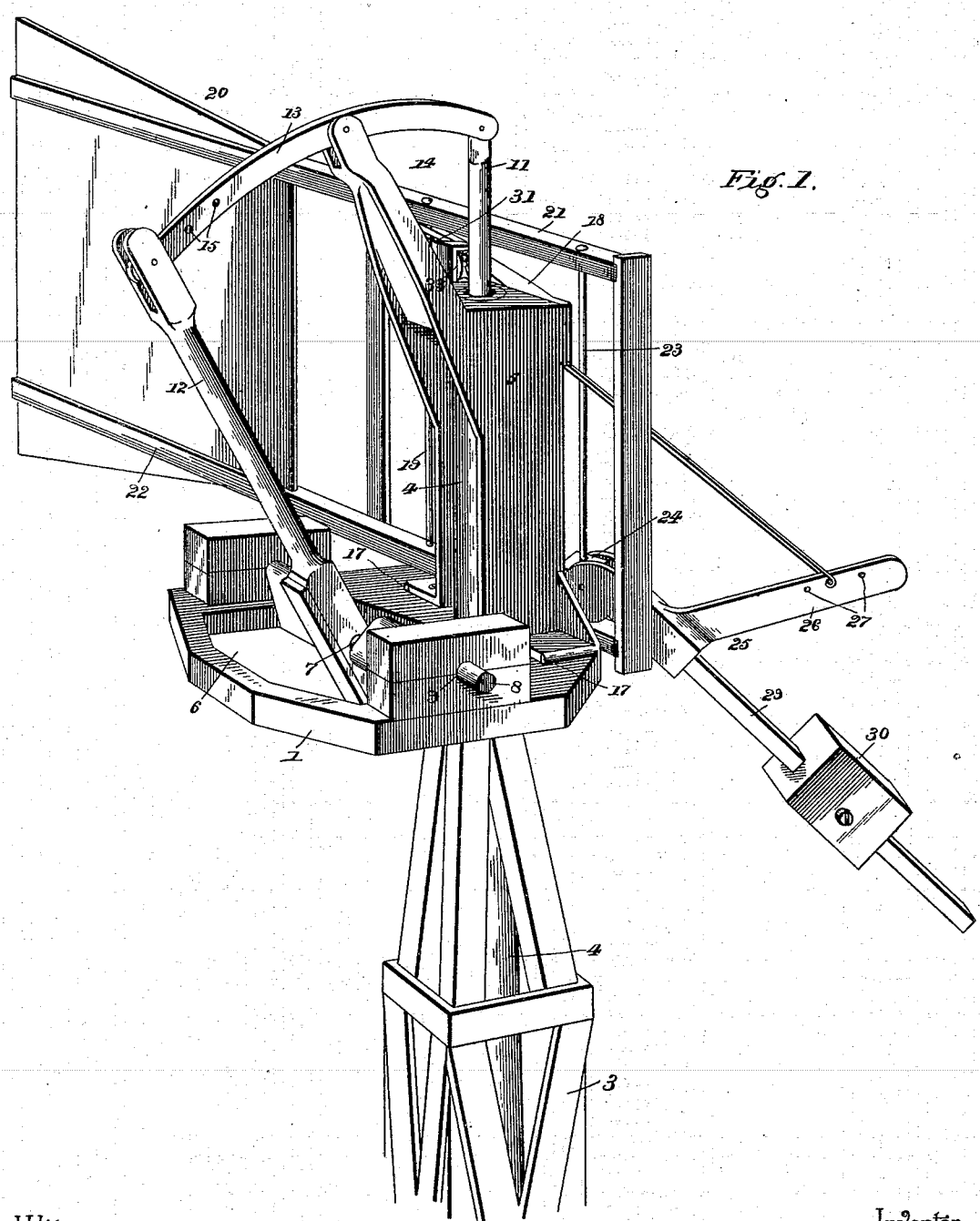

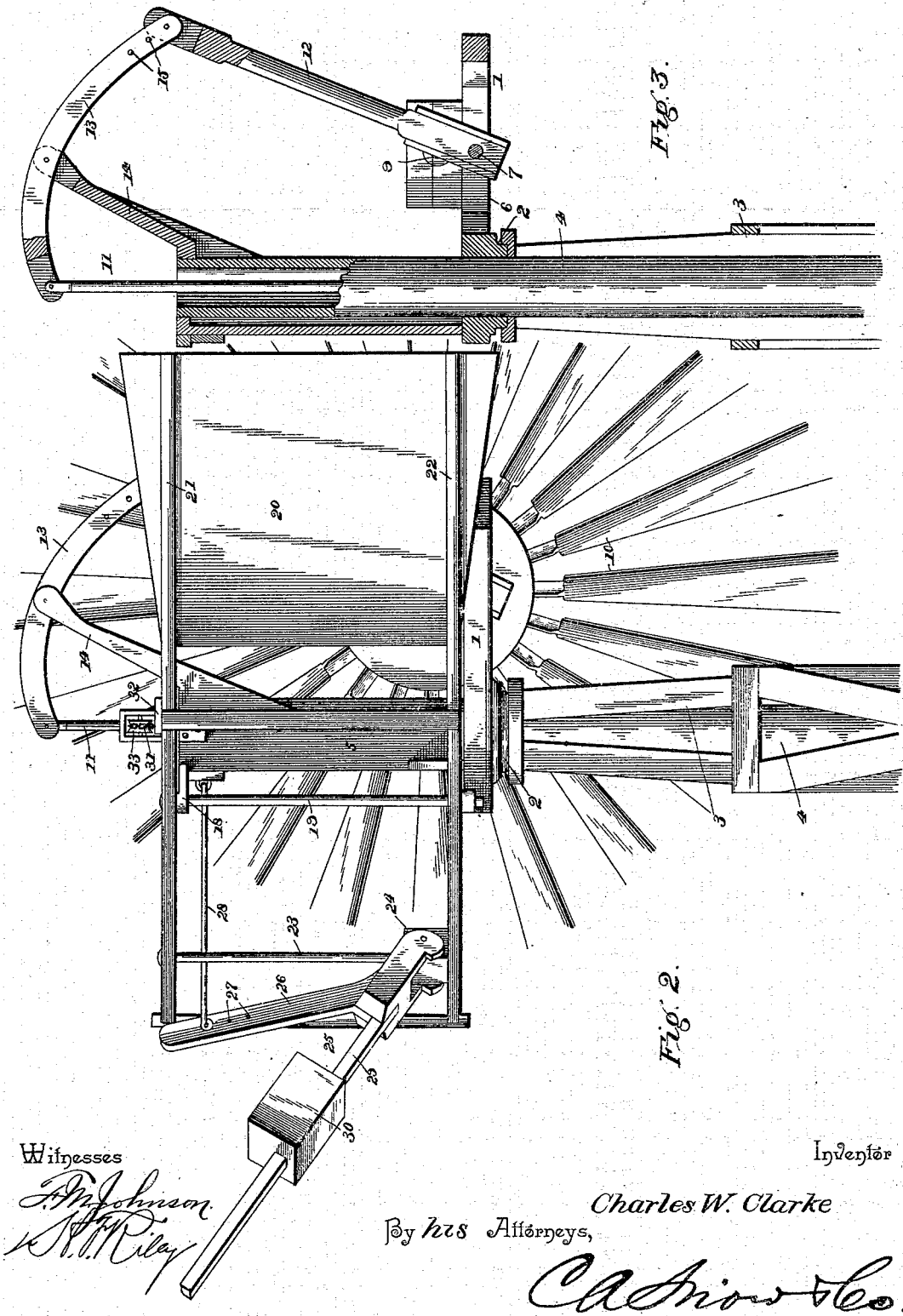

CHARLES W. CLARKE, OF HANFORD, CALIFORNIA.

WINDMILL.

SPECIFICATION forming part of Letters Patent No. 503,652, dated August 22, 1893.

Application filed February 6, 1893. Serial No. 461,163. (No model.)

*To all whom it may concern:*

Be it known that I, CHARLES W. CLARKE, a citizen of the United States, residing at Hanford, in the county of Tulare and State of California, have invented a new and useful Windmill, of which the following is a specification.

The invention relates to improvements in wind mills.

The object of the present invention is to simplify and improve, and increase the efficiency of wind mills, and to provide one in which the parts will counterbalance and bring the center of gravity directly over the top of the tower, whether the wind wheel be in or out of the wind.

The invention consists in the construction and novel combination and arrangement of parts hereinafter fully described, illustrated in the accompanying drawings and pointed out in the claims hereto appended.

In the drawings—Figure 1 is a perspective view of a wind mill constructed in accordance with this invention, and showing the position of the parts when the wind wheel is in the wind. Fig. 2 is an elevation showing the position of the parts when the wind wheel is out of the wind. Fig. 3 is a central vertical sectional view the parts being in position shown in Fig. 2.

Like numerals of reference indicate corresponding parts in all the figures of the drawings.

1 designates a horizontal frame provided on its lower face with a turn table 2 and mounted rotatively on the top of a tower 3 which is provided with a vertical tube 4 forming a spindle for a standard 5 of the frame 1. The turn table is located at one side of the horizontal frame 1, which is provided with an opening 6 to permit a crank bend 7 of a shaft 8 to revolve freely. The shaft is journaled in suitable bearings 9 at opposite ends of the openings 6, and carries at one end, which is extended beyond the frame, a wind wheel 10. The wind wheel causes the shaft 8 to rotate and motion is communicated to a pump rod 11 by means of a pitman 12 and an oscillating lever or walking beam 13 which is fulcrumed between its ends in the bifurcation of an inclined arm 14 extending upward from the top of the standard 5. The inner end of the oscillating lever 13 is bifurcated to receive the upper end of the pump rod, and the other end of the oscillating lever is provided with a series of perforations 15, and is pivoted by a bolt to the upper end of the pitman which is adapted to be adjusted on the oscillating lever, by means of said perforations and the bolt or pin to vary the length of the stroke of the pump rod.

The standard 5 is hollow and is provided at its lower end with securing flanges which are bolted to the upper face of the horizontal frame 1, and the latter is provided with ribs 17 arranged to form a socket for the lower end of the hollow standard. The ends of the hollow standard are provided with bearings for the vertical tubular spindle 4 and extending from the top of the hollow standard is a horizontal arm 18 terminating at its outer end over one corner of the horizontal frame 1. The arm 18, and the corner of the frame vertically below it are provided with bearing eyes and receive a pintle rod 19, which hinges a vane 20 to the frame. The vane has parallel upper and lower bars 21 and 22 extending inward from the blade to the pintle rod and beyond the same, and the bars are connected and supported by vertical bars.

The extended portions of the bars 21 and 22 have secured to them a vertical rod 23 forming a spindle or pintle for a block 24 to which is hinged a bell-crank lever 25 which is weighted, and is adapted to hold the vane at right angles to the wind wheel to keep the latter in the wind. The arm 26 of the bell-crank lever is provided at its outer end with a series of perforations 27, and is connected by a link 28 with the top of the hollow standard, and the perforations permit an adjustment of the connection. The inner end of the arm 26 of the bell-crank lever is enlarged and bifurcated to receive the block 24. The arm 29 of the bell-crank lever extends from the enlarged portion of the arm 26, and is provided with an adjustable weight 30.

The wind mill is controlled by a chain 31 having one end attached to an arm 32 of the vane and extending from the arm over a pulley 33 and down the vertical tube and terminating at the base of the tower. The arm 32 extends inward from the vane at a point between the blade and the pintle rod, whereby when the chain is drawn the vane will be turned at right angles to the wind wheel and the weighted bell-crank lever will be lifted. The pulley 33 is mounted in a bracket located at the top of the hollow standard and secured thereto.

The vane and the weighted bell-crank lever are disposed opposite and counterbalance the wind wheel, and the parts preserve a continual equipoise, and as the vane is turned inward to throw the wind wheel out of the wind, the bell-crank lever moves outward to preserve the balance.

It will be seen that the wind mill is simple, comparatively inexpensive and effective, that the stroke of the pump rod may be readily regulated, and that the parts are balanced to prevent any lateral straining on the tower.

Changes in the form, proportion and the minor details of construction may be resorted to without departing from the principle or sacrificing any of the advantages of this invention.

What I claim is—

1. In a wind mill, the combination of a tower, a frame rotatively mounted thereon and having a standard provided at its upper end with a horizontal arm, a vane hinged to the arm and the frame and extended beyond the point of hinging, an upwardly and horizontally swinging bell-crank lever hinged to the extension of the vane and having its lower arm provided with a weight, a link connecting the other arm of the bell-crank lever with the top of the standard, and means for turning the vane against the action of the weight, substantially as described.

2. In a wind mill, the combination of a tower, a frame rotatively mounted thereon and provided with a standard and having an arm extending horizontally from the top of the standard, a vane hinged to the arm and the frame and provided with an extension, a rod vertically secured to the extension, a block hinged to the vertical rod, an upwardly and horizontally swinging vertically disposed bell-crank lever hinged to the block and having its lower arm weighted, a link connecting the other arm with the lever with the top of the standard, and a chain for moving the vane against the action of the weight, substantially as described.

3. In a wind mill, the combination of a tower, a horizontal frame provided at one side with a turn table mounted on a tower, a shaft carrying a wind wheel arranged at the opposite side of the frame, a pump rod, means for connecting the pump rod with the shaft, a vane having an extension and hingedly connected to the frame and having the turn table between it and the shaft to counterbalance the frame, an upwardly and horizontally swinging weighted bell-crank lever hingedly connected to the extension of the vane and having one arm connected with the frame, and means for moving the vane against the action of the weight, substantially as described.

In testimony that I claim the foregoing as my own I have hereto affixed my signature in the presence of two witnesses.

CHARLES W. CLARKE.

Witnesses:
R. MILLS,
J. R. BECKWITH.